United States Patent [19]
De Witt et al.

[11] 3,869,255
[45] Mar. 4, 1975

[54] CLOSED LOOP REFLUX SYSTEM

[75] Inventors: Robert De Witt, Centerville; Bernhart E. Jepson, Dayton; Roger A. Schwind, Centerville, all of Ohio

[73] Assignee: The United States of America as represented by the United States Atomic Energy Commission, Washington, D.C.

[22] Filed: Jan. 10, 1973

[21] Appl. No.: 322,566

[52] U.S. Cl.............. 23/263, 204/98, 204/104, 204/301, 423/242, 423/400, 423/539
[51] Int. Cl..... B01d 3/00, B01d 59/12, C01b 17/48
[58] Field of Search...... 23/263, 260; 423/539, 400, 423/235, 242; 204/301

[56] References Cited
UNITED STATES PATENTS

| | | | |
|---|---|---|---|
| 2,923,601 | 2/1960 | Taylor et al. | 423/400 |
| 3,524,801 | 8/1970 | Parsi | 423/242 X |
| 3,645,882 | 2/1972 | Parsi | 204/301 |

Primary Examiner—Joseph Scovronek
Attorney, Agent, or Firm—John A. Horan; Dudley W. King; Ignacio Resendez

[57] ABSTRACT

Sulfur isotopes are continuously separated and enriched using a closed loop reflux system wherein sulfur dioxide ($SO_2$) is reacted with sodium hydroxide (NaOH) or the like to form sodium hydrogen sulfite ($NaHSO_3$). Heavier sulfur isotopes are preferentially attracted to the $NaHSO_3$, and subsequently reacted with sulfuric acid ($H_2SO_4$) forming sodium hydrogen sulfate ($NaHSO_4$) and $SO_2$ gas which contains increased concentrations of the heavier sulfur isotopes. This heavy isotope enriched $SO_2$ gas is subsequently separated and the $NaHSO_4$ is reacted with NaOH to form sodium sulfate ($Na_2SO_4$) which is subsequently decomposed in an electrodialysis unit to form the NaOH and $H_2SO_4$ components which are used in the aforesaid reactions thereby effecting sulfur isotope separation and enrichment without objectionable loss of feed materials.

5 Claims, 1 Drawing Figure

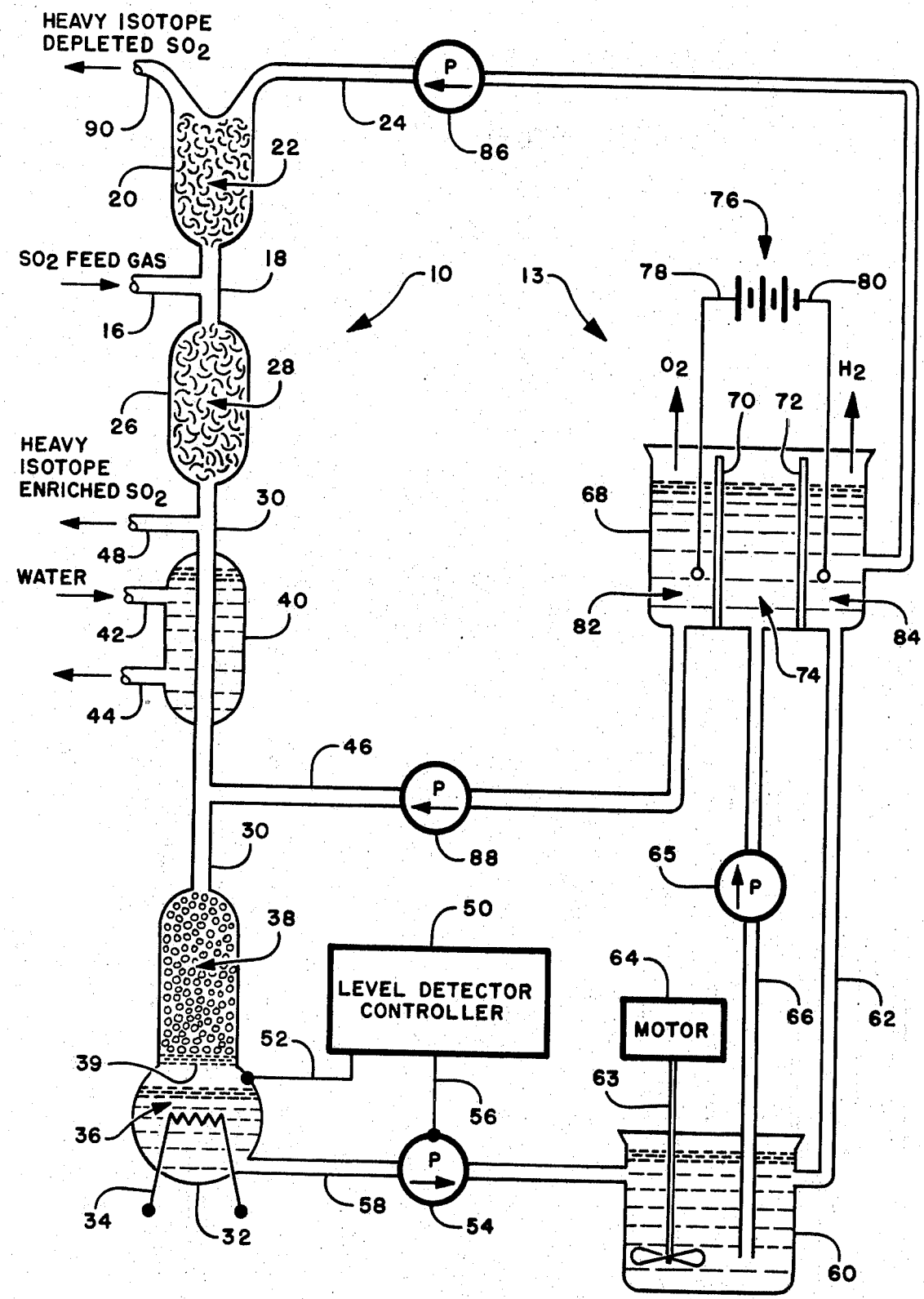

CLOSED LOOP REFLUX SYSTEM

BACKGROUND OF INVENTION

This invention is concerned with continuous isotope separation and enrichment in a closed loop reflux system.

The separation of sulfur-34 ($^{34}S$) from sulfur-32 ($^{32}S$) using the bisulfite chemical exchange system is generally known. An equation representative of this reaction is $$^{34}SO_2 \text{ (Gas)} + H^{32}SO_3^- \text{ (Aqueous)} \rightleftharpoons {}^{32}SO_2 \text{ (Gas)} + H^{34}SO_3^- \text{ (Aqueous)}. \quad (1)$$

This separation, however, has not been developed into general usage because of the problem in providing closed loop reflux, i.e., the process as known requires the use of large quantities of chemicals in relation to the amounts of separated isotopes produced. The major drawback to such a system, therefore, is the need for large quantities of chemicals and the resultant waste disposal problem or reclamation problem, since open end reflux systems require continuous supply of chemicals and consequently produce a waste chemical stream. Prior art chemical exchange processes for enrichment of sulfur isotopes are open end systems having the above noted problems.

SUMMARY OF INVENTION

In order to overcome the foregoing problems and disadvantages, it is an object of this invention to provide a closed loop reflux system which does not require continuously recharging with large quantities of fresh chemicals for the reaction.

It is a further object of this invention to provide a closed loop reflux system which eliminates or minimizes waste disposal problems of the prior art.

It is a further object of this invention to utilize a novel combination of an electrodialysis system with a chemical exchange system.

It is a further object of this invention to use an electrodialysis system for converting $Na_2SO_4$ into NaOH and $H_2SO_4$ which are subsequently used in the separation and concentration of a sulfur isotope in a bisulfite chemical exchange system.

Various other objects and advantages will appear from the following description of the system and the apparatus used and are particularly pointed out hereinafter in connection with the appended claims. It is understood that persons skilled in the art may make various changes in the design, materials, etc., as described herein within the principles and scope of this invention as brought out in the appended claims.

The invention comprises a continuous closed loop reflux system for separation and enrichment of different isotopes of an element by the use of electrodialysis apparatus together with a chemical exchange system. The invention further comprises the enrichment of isotopes of sulfur wherein $SO_2$ feed gas containing different sulfur isotopes is reacted with NaOH to form $NaHSO_3$ in a chemical exchange column wherein the heavier isotopes of sulfur are preferentially carried with the $NaHSO_3$ and thereafter the $NaHSO_3$ is reacted with $H_2SO_4$ effecting the separation of $SO_2$ enriched in heavier isotope which is removed from the chemical exchange system and wherein the $H_2SO_4$ and NaOH are regenerated and recycled to maintain a closed loop circuit.

DESCRIPTION OF DRAWING

The drawing illustrates a typical reaction column and electrodialysis system for the process of this invention.

DETAILED DESCRIPTION

Apparatus for effecting the present invention may comprise a reaction column 10 and electrodialysis unit 13 as shown in the drawing. The reaction column 10 provides the means for the enrichment of the isotopes while the electrodialysis system 13 regenerates the chemicals required for reaction with the feed gas in reaction column 10 from the reaction products of the reaction column 10.

Although this invention is applicable to many reactions or separations such as the enrichment of nitrogen-15 ($^{15}N$) by exchange between ammonia and aqueous solutions of ammonium sulfate, ammonium nitrate, or ammonium hydroxide, the enrichment of sulfur isotopes will be presented herein. This, however is not intended to restrict the apparatus to the separation of sulfur isotopes.

In separating different sulfur isotopes in accordance with equation 1 as stated hereinabove, $SO_2$ feed gas is reacted with NaOH as follows:

$$SO_2 + NaOH \rightarrow NaHSO_3 \quad (2)$$

The heavier sulfur isotopes in the $SO_2$ feed gas preferentially go into the $NaHSO_3$ formed in equation 2. Thereafter $NaHSO_3$ is reacted with $H_2SO_4$ and the products of this reaction are $NaHSO_4$, water ($H_2O$) and $SO_2$ as follows:

$$H_2SO_4 + NaHSO_3 \rightarrow NaHSO_4 + H_2O + SO_2 \uparrow \quad (3)$$

The $SO_2$ formed in the reaction of equation 3 is more concentrated in the heavier sulfur isotope and may be removed from the exchange column. The $NaHSO_4$ is reacted with NaOH and forms $Na_2SO_4$. The $Na_2SO_4$ is decomposed in an electrodialysis unit to form $H_2SO_4$, which is one of the reactants in equation 3, and NaOH which is the other reactant in equation 2 so that a closed loop reflux system using this reaction may be effected.

In the drawing, $SO_2$ feed gas or other suitable fluid which contains different sulfur isotopes such as sulfur-34 ($^{34}S$) in quantities such as about 4.2% and sulfur-33 ($^{33}S$) at about 0.7% as well as sulfur-36 ($^{36}S$) at about 0.014% may be fed into conduit 16 which joins with or feeds into conduit 18. The $SO_2$ feed gas will then enter into reaction vessel 20 which may have an appropriate filler 22, such as stainless steel wire spirals, disposed therein to increase the surface area of the reactants contacting the $SO_2$ and enhance the reaction. NaOH at a molarity of between about 1 molar and 6 molar and preferably at about 3 molar may be fed in through conduit 24 into reaction vessel 20 so as to thoroughly contact the $SO_2$ feed gas and react therewith in reaction vessel 20 forming $NaHSO_3$ as per equation 2. The $NaHSO_3$ formed may flow downward into a chemical exchange column or second reaction vessel 26 which may also contain disposed therein a filler material 28 similar to and for the same purpose as filler material 22. The $NaHSO_3$ formed in reaction column 20 traverses or passes through reaction vessel 26 into conduit 30 and subsequently into distillation flask or apparatus 32. Second reaction vessel 26 is provided for the purpose of enriching the NaHSO₃ with the heavier isotope.

Distillation flask, vessel or apparatus 32 is heated by such as an electrical resistance heater 34 or the like heating means. When the separation and enrichment of the heavier sulfur isotope such as $^{34}S$ isotope is commenced, distillation flask 32 may have water removed or may be partially filled with water to adjust to the desired concentrations. However, the solution 36 within distillation flask 32 will become the reaction product of the NaHSO₃ with H₂SO₄ as will be described hereinafter. Also disposed within a portion of distillation flask 32 is an appropriate filler material 38 such as ceramic raschig rings or Berl saddles which have the purpose of increasing the surface area of the reactants therein so as to enhance the reaction. A permeable wall 39 may be positioned between filler material 38 and solution 36 to maintain the filler material separate from the bottom portion of flask 32. Distillation vessel 32 may be heated to a temperature of from about 25°C to about 70°C and is preferably maintained at about 30°C to about 45°C for the separation and enrichment of sulfur isotopes, including $^{34}S$ from $^{32}S$. A suitable vapor condenser 40 which may include a water or other fluid cooling jacket may be disposed adjacent or about conduit 30 so as to condense vapors being generated at distillation flask 32. The cooling fluid may be used entering at conduit 42 and exiting at conduit 44.

H₂SO₄ of molarity of from about 1 molar to about 6 molar, and preferably at a concentration of about 3 molar, may be input into conduit 30 by means of conduit 46. It is desirable to maintain the concentration within the given range in order to optimize enrichment of desired isotopes. H₂SO₄ reacts with the NaHSO₃ product of reaction vessel 20 in flask 32 as per equation 3. SO₂ with a higher concentration of $^{34}S$ than the feed gas or other heavy isotope desired to be separated, is one of the reaction products and may be removed through conduit 48. This product, low in $^{32}S$ concentration, could then be used as feed material in another cascade to enrich $^{34}S$ and $^{36}S$ if present. Equation 3 reaction takes place within the upper portion of distillation flask 32 and generally around the filler material 38. The H₂O and the NaHSO₄ which are the other products of equation 3 descend into distillation flask 32. A liquid level within distillation flask 32 is maintained by means of fluid level detector and controller 50 which is appropriately connected to flask 32 and to pump 54 by suitable means such as through electrical connections 52 and 56. Conduit 58 may be used to remove the NaHSO₄ and H₂O products of equation 3 from distillation flask 32 into a suitable container or mixing vessel 60 using pump 54 which is actuated as required by level detector and controller 50.

The NaHSO₄ solution which is the product of equation 3 is removed from distillation flask or vessel 32 and reacted in container 60 with NaOH solution which is fed in by means of conduit 62. Water in distillation flask 32 is also carried over into container 60 in the same manner. Suitable stirring means 63, such as a propeller connected to a suitable power source like motor 64, may be used to thoroughly agitate the solution and insure thorough mixing and consequent reaction of the NaOH and the NaHSO₄. The equation for this reaction is:

$$NaOH + NaHSO_4 \rightarrow Na_2SO_4 + H_2O \quad (4)$$

The Na₂SO₄ formed by this equation reaction is appropriately removed from container 60 such as through pump 65 through conduit 66 and transferred to an electrodialysis unit 13. Conduit 66 interconnects or communicates with container 60 and container 68 of electrodialysis unit 13 and, more specifically, with the chamber, cell, or compartment 74 formed by the walls of container 68 and an anion permeable membrane 70 and a cation permeable membrane 72. The compartment 74 contains Na₂SO₄ and H₂O transferred from container 60. A suitable power source, such as battery 76, may be used to create a dissociation current between anode 78 and cathode 80 and through the various solutions in container 68. Anode 78 may be disposed within a chamber, cell or compartment 82 situated adjacent chamber 74 but separated therefrom by anion permeable membrane 70. Cathode 80 may be disposed within chamber, cell or compartment 84 which is situated adjacent chamber 74 but separated therefrom by cation permeable membrane 72. The walls of chamber 68 together with the anion and cation membranes may form compartments or chambers 82 and 84 respectively. Production of a current though the solutions may effect migration of the sodium ion (Na⁺) (from the Na₂SO₄ in solution) from chamber 74 to chamber 84 through cation permeable membrane 72 and also effect the migration of the sulfate ion (SO₄⁼) (from the Na₂SO₄ in solution) through anion permeable membrane 70 into chamber 82. Water will be decomposed in chamber 84 to form hydrogen gas and OH⁻ to maintain electrical neutrality with Na⁺ which was transported into the cell to form the NaOH. Oxygen is released as oxygen gas (O₂) in chamber 82 and the products H⁺ of water decomposition and the SO₄⁼ which is transporting into chamber 82 form the H₂SO₄. The NaOH is removed from chamber 84 by means of an appropriate conduit 24 and is circulated by means of pump 86 into reaction vessel 20. H₂SO₄ formed within chamber 82 is removed therefrom by means of pump 88 to react with the NaHSO₃ in the upper portion of distillation flask 32.

SO₂ feed gas which is depleted in heavy isotopes may be suitably removed from reaction column 10 such as through vent pipe or conduit 90 at reaction vessel 20.

The reactions in the electrode chambers of the electrodialysis unit are as follows:

$$\text{Cathode: } 2Na^+ + 2e^- + 2HOH \rightarrow 2Na^+ + 2OH^- + H_2\uparrow \quad (5)$$

$$\text{Anode: } SO_4^= + HOH \rightarrow H_2SO_4 + 2e^- + 1/2O_2\uparrow \quad (6)$$

The SO₂ feed gas into conduit 16 may be preheated to a suitable temperature such as about 100°C but may preferably be input at ambient temperature. Additions of H₂O or other components such as NaOH or H₂SO₄ to maintain the required concentration, if necessary, may be made directly into conduits 24 and 46 respectively.

The solution within container 68 of the electrodialysis unit 13 is maintained at a temperature of from about 20°C to about 100°C and preferably at about ambient temperature. The solution within container 60 is maintained at a temperature of from about 25°C to about 100°C and preferably at about ambient temperature. Reaction vessels 20 and 26 are maintained at a temperature of from about 20°C to about 100°C and preferably at about 45°C.

The $SO_2$ feed gas which is input into conduit 16 may be fed in at a rate determined by the capacity of the system and desired separation rates and may typically be about 3 pounds per day where separations of about 90% $^{34}S$ are desired. Pumps 54, 65, 86, and 88 may be any appropriate type well known in the art which are not affected by the solutions which they transfer.

Although NaOH having a molarity between about 1 and about 6 has been used in the separation process, other reaction solutions which may be used in the reactor are from about 1 molar to about 6 molar potassium hydroxide (KOH), and from about 1 molar to about 12 molar ammonium hydroxide ($NH_4OH$). The temperature of these solutions may generally vary from about 20 to about 100°C but preferably are maintained at about 45°C.

Since the NaOH or the like preferentially reacts with the heavy sulfur isotope such as $^{34}SO_2$ to form $NaHSO_3$, a greater percentage of $^{34}SO_2$ reacts with the NaOH than $^{32}SO_2$. The depleted feed gas may then be vented through vent pipe 90 as stated hereinabove. Reaction vessel 26 achieves enrichment of $^{34}S$ also by refluxing a portion of the enriched $^{34}SO_2$ gas released from reaction vessel 32 upon decomposition of the $NaHSO_3$ through this second reaction vessel 26.

The quantities of concentrations of materials used, volume wise, is dependent upon the size of the vessel which is to be used. In a typical operation however, the $SO_2$ feed gas may be initially enriched about 20 to about 90% $^{34}S$ from a 5 unit or other conventional enrichment process if such is required or desired. With a feed gas having about 4.2% enrichment of $^{34}SO_2$, reaction columns 30 feet long may be used to enrich $SO_2$ to about 90% $^{34}SO_2$. With columns of about 4 inch to about 1 inch in diameter, approximately 4.0 grams of 90% $^{34}S$ enriched $SO_2$ may be produced per day. $SO_2$ in these experiments may be passed up through vessel 20 at a flow rate of about 3 pounds per day. The $NaHSO_3$ thus formed may be decomposed from distillation flask 32 at a temperature of from about 20°C to about 140°C.

Table I illustrates results that may be obtained in this enrichment process.

TABLE I $^{34}S$ Production Cases

All Raffinate >98% $^{32}S$

| Sulfur-34, Conc. % | Sulfur-33 Conc. % | Prod. Rate gram/day | Sulfur-36 Conc. % | Raffinate Rate Sulfur-32, g/day |
|---|---|---|---|---|
| 20 | 2.2 | 22.9 | 0.08 | 135 |
| 30 | 2.9 | 13.9 | 0.13 | 126 |
| 40 | 3.6 | 10.0 | 0.17 | 111 |
| 50 | 4.3 | 7.8 | 0.21 | 111 |
| 60 | 4.9 | 6.4 | 0.26 | 111 |
| 70 | 5.4 | 5.4 | 0.30 | 110 |
| 80 | 5.8 | 4.7 | 0.34 | 110 |
| 90 | 6.0 | 4.1 | 0.39 | 110 |

Although the system described herein has been primarily described for sulfur isotope separation, the novel combination of a chemical exchange reaction column with an electrodialysis unit may be used where applicable to effect closed loop reflux circuits, and is not intended to be limited to sulfur isotopic separation process. For Example, $SO_2$ may be enriched in $^{36}S$ as shown by Table II.

TABLE II $^{36}S$ Production Cases

| Sulfur-36 Conc. % | Total Prod. Rate, grams/day | Sulfur-34 Conc. % |
|---|---|---|
| 20 | 0.13 | 80 |
| 30 | 0.088 | 70 |
| 40 | 0.066 | 60 |
| 50 | 0.053 | 50 |

Sulfur isotope production of the above-described reaction column has been determined using a separation factor of 1.007, flow rate of 2.9 liters/day, and bisulfite concentrations of 3 M. Values of height equivalent of a theoretical plate (HETP) used for the determination of the values given in Table I and Table II in the bisulfite process or hydrogen sulfite process ranged from 2.5 to 9 centimeters.

The capacity of the above-described reaction vessel for production of 90% sulfur-34 has been determined, using the above values, to be about 4 grams per 24 hours. It should be noted that sulfur-33 ($^{33}S$) may also be produced at an enrichment of about 6%. $^{33}S$ may be of considerable interest in various research studies involving nuclear magnetic resonance. Fractional gram production of sulfur-36 ($^{36}S$) may also be possible as illustrated in Table II although equilibrium times may be longer. $^{33}S$ and $^{36}S$ may also be removed through exit conduit 48.

The initial $^{33}S$, $^{34}S$ and $^{36}S$ concentrations in the $SO_2$ feed gas were 0.7%, 4.2% and 0.014% respectively in the examples given in Table I and Table II. The raffinate rate referred to in Table I is removed from conduit 90 in the drawing. The raffinate contains in all cases greater than 98% concentration of $^{32}S$.

As shown in Table II, $^{36}S$ production may be effected using the apparatus of this invention. $SO_2$ containing about 0.014% $^{36}S$ may be fed into the solution and $^{36}S$ separated from $^{32}S$. This is effected in the same manner as a separation of $^{34}S$ from $^{32}S$ is effected. The $^{36}S$ has an affinity to react with the NaOH and thus form $NaHSO_3$ which is thereafter reacted with $H_2SO_4$ as described hereinabove to release $^{36}S$ enriched $SO_2$ gas which may be removed through conduit 48.

The closed loop reflux system achieved by this reaction column and electrodialysis unit combination requires no continuous external supply of chemicals other than the initial charge and does not produce any waste chemical solutions or products which have to be disposed of. This is accomplished in chemical reflux by converting the waste stream to the reflux stream chemicals. The closed loop reflux system is paramount to the chemical exchange process and produces a bisulfate exchange system as described and applied herein which is economically attractive and ecologically desirable.

What is claimed is:

1. Apparatus adapted to separation of different isotopes of sulfur contained in a feed fluid wherein the chemicals used for the separation process are reacted with said feed fluid, regenerated and reused, comprising; a reaction vessel, a distillation vessel, output means on said reaction vessel for removing heavy isotope depleted fluid, initial conduit means for transferring reacted fluid from said reaction vessel to said distillation vessel, condensing means adjacent said initial conduit and said distillation vessel for condensing fluid from said distillation vessel in said initial conduit means, input means disposed on said reaction vessel for feeding one of said chemicals into said reaction vessel, first input means on said initial conduit for feeding said feed fluid into said initial conduit means, second input means disposed after said condenser and on said initial conduit for feeding another of said chemicals into said initial conduit means; output means for removing isotope enriched fluid disposed between said first input means and said condenser on said initial conduit means; a mixing vessel, means for transferring fluid interconnecting said distillation vessel and said mixing vessel; electrodialysis apparatus including a container, an anion permeable membrane and a cation permeable membrane disposed within said container and dividing said container into at least three compartments, a cathode disposed within a first of said at least three compartments, an anode disposed within a second of said at least three compartments, a power source electrically interconnecting said anode and said cathode; conduit means disposed on a third of said at least three compartments for transferring materials from said mixing vessel to said third compartment, said third compartment being adjacent said first and said second compartments, conduit means for transferring material from said first compartment to said mixing vessel, said input means interconnecting said first compartment and said reaction vessel for transferring said one of said chemicals from said first compartment to said reaction vessel, and said second input means interconnecting said second compartment and said initial conduit for transferring said another of said chemicals from said second compartment to said initial conduit.

2. The apparatus of claim 1 together with pumping means at said conduit means interconnecting said first compartment and said reaction vessel, pumping means disposed on said further conduit means interconnecting said second compartment and said initial conduit, pumping means disposed on said conduit means interconnecting said mixing vessel and said third compartment, and pumping means disposed on said means for transferring fluid interconnecting said distillation flask and said mixing vessel.

3. The apparatus of claim 2 together with level detector and controller means disposed and electrically connected between said distillation vessel and said pumping means on said means interconnecting said distillation vessel and said mixing vessel for controlling fluid level in said distillation vessel.

4. The apparatus of claim 1 together with an additional reaction vessel on said initial conduit means between said first input means on said initial conduit means and said output means on said initial conduit means.

5. The apparatus of claim 1 together with means for agitating fluid within said mixing vessel.

* * * * *